(12) United States Patent
Paprotna et al.

(10) Patent No.: US 7,562,880 B2
(45) Date of Patent: Jul. 21, 2009

(54) SEAL USABLE BETWEEN THERMALLY MOVABLE COMPONENTS

(75) Inventors: Hubertus Edward Paprotna, Winter Springs, FL (US); David A. Little, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 571 days.

(21) Appl. No.: 10/774,907

(22) Filed: Feb. 9, 2004

(65) Prior Publication Data
US 2005/0173871 A1 Aug. 11, 2005

(51) Int. Cl.
*F16J 15/02* (2006.01)
*F01D 25/26* (2006.01)
*F01D 5/20* (2006.01)

(52) U.S. Cl. ............... 277/644; 277/650; 415/139; 415/173.3; 415/174.2

(58) Field of Classification Search ........... 277/644, 277/648–649, 650; 415/138–139, 135, 173.3, 415/174.2
See application file for complete search history.

(56) References Cited

U.S. PATENT DOCUMENTS

| 1,816,293 | A | | 7/1931 | Oberhuber |
| 3,046,648 | A | | 7/1962 | Kelly |
| 3,682,489 | A | * | 8/1972 | Fischer ............... 277/594 |
| 3,801,220 | A | * | 4/1974 | Beckershoff ......... 416/198 R |
| 4,103,905 | A | | 8/1978 | Desmond et al. |
| RE30,600 | E | | 5/1981 | Long et al. |
| 4,311,432 | A | | 1/1982 | Kildea |
| 4,477,086 | A | | 10/1984 | Feder et al. |
| 4,524,981 | A | * | 6/1985 | Hertz, Jr. ............... 277/529 |
| 4,537,024 | A | | 8/1985 | Grosjean |
| 4,976,444 | A | * | 12/1990 | Richards ............... 277/412 |
| 5,076,591 | A | | 12/1991 | Gentile |
| 5,167,485 | A | * | 12/1992 | Starkweather ......... 415/115 |
| 5,181,728 | A | | 1/1993 | Stec |
| 5,183,268 | A | * | 2/1993 | Wong et al. ........... 277/328 |
| 5,221,096 | A | | 6/1993 | Heldreth et al. |
| 5,308,088 | A | | 5/1994 | Atkinson et al. |
| 5,509,669 | A | | 4/1996 | Wolfe et al. |
| 5,586,773 | A | | 12/1996 | Bagepalli et al. |
| 5,653,447 | A | * | 8/1997 | Cress ................... 277/312 |
| 5,865,600 | A | * | 2/1999 | Mori et al. ............ 416/198 A |
| 5,975,844 | A | | 11/1999 | Milazar et al. |
| 6,164,655 | A | * | 12/2000 | Bothien et al. ......... 277/303 |
| 6,315,301 | B1 | | 11/2001 | Umemura et al. |
| 6,431,550 | B1 | * | 8/2002 | Tong ................... 277/346 |
| 6,609,886 | B2 | | 8/2003 | Aksit et al. |
| 6,733,234 | B2 | * | 5/2004 | Paprotna et al. ........ 415/138 |
| 6,883,807 | B2 | * | 4/2005 | Smed ................... 277/644 |
| 2003/0011145 | A1 | | 1/2003 | Zhuo et al. |
| 2003/0099542 | A1 | | 5/2003 | Czachor et al. |
| 2003/0133792 | A1 | | 7/2003 | Vedantam et al. |

* cited by examiner

*Primary Examiner*—Vishal Patel

(57) ABSTRACT

A seal usable between two thermally movable components to prevent fluids from mixing. For instance, the seal may be used to seal thermally movable components of a turbine engine that may include, but are not limited to, leading edge shrouds, isolation rings, ring segments, and vane segments. The seal may be formed from a body having a cross-section generally orthogonal to a longitudinal axis and include a first side, a second side generally opposite to the first side, a first end, and a second end generally opposite to the first end. A compliant material may be coupled to the first or second end, or both, and may absorb thermal expansion of the two thermally movable components. The seal may reduce leakage flow paths between the seal and the thermally movable components.

4 Claims, 3 Drawing Sheets

SEAL USABLE BETWEEN THERMALLY MOVABLE COMPONENTS

FIELD OF THE INVENTION

This invention is directed generally to seals, and more particularly to seals usable between thermally movably components such as those commonly found in turbine engines.

BACKGROUND

Typically, gas turbine engines include a compressor for compressing air, a combustor for mixing the compressed air with fuel and igniting the mixture, and a turbine assembly for producing power. Combustors often operate at high temperatures that may exceed 2,500 degrees Fahrenheit. As a result, turbine engines often contain secondary flow paths forming cooling systems for prolonging the life of turbine components and reducing the likelihood of failure as a result of excessive temperatures. Allowing the combustion gases and cooling gases found in secondary flow paths to mix is detrimental to engine performance and is generally undesirable.

Many turbine engines include noteworthy leakage paths between gas turbine components, such as adjacent vanes, ring segments, et cetera. Sealing this leakage path is problematic because the seal must be able to accommodate radial, circumferential, and angular movements between the components while maintaining an adequate seal. Such movements are often caused by assembly misalignment, vibration during operation of a turbine engine, and different thermal expansion between adjacent components.

Conventional seals, as shown in FIG. 1, typically are inefficient at sealing these gaps because many conventional seals are rigid and do not conform to the misalignment. Most rigid seals include a predetermined clearance to account for transient movements of mating components and to allow for manufacturing and assembly tolerances. If clearance is not included in a rigid seal, the seal can bind and cause damage to the seal or adjacent components. While this clearance is necessary with rigid seals, such clearance increases the leakage around the seal resulting in a decrease in performance. Thus, a need exists for a seal capable of sealing gaps more efficiently between thermally movable components.

SUMMARY OF THE INVENTION

This invention relates to a seal usable between two thermally movable components. In at least one embodiment, the seal may be used to seal components of a turbine engine in which the thermally movable components may include, but are not limited to, leading edge shrouds, isolation rings, ring segments, and vane segments. The seal may be formed from a body having a longitudinal axis for sealing space between adjacent thermally movable components to prevent a fluid from passing between the adjacent components. The sealing element has a cross-section generally orthogonal to the longitudinal axis that has a first side, a second side generally opposite to the first side, a first end, and a second end generally opposite to the first end. The first end may be formed from a compliant material configured to expand in a direction generally orthogonal to the longitudinal axis to contact one of the two thermally movable components. Thus, the leakage flow path that may exist between the seal and the thermally movable component may be reduced in transient states because the compliant material may absorb thermal expansion of the thermally movable components. In other embodiments, the compliant material may be included on the second end as well as the first end.

The compliant material may be formed from materials, such as, but not limited to, one or more teeth, a feltmetal, a honeycomb, a brush seal material, or other appropriate material. In at least one embodiment, the compliant material may be a single tooth, or a plurality of teeth, forming a labyrinth seal. One or more teeth may extend from the first end of the seal at an angle of between about 30 degrees and about 60 degrees relative to an outer surface of the first end, and more specifically, may extend at an angle of about 45 degrees. In addition, one or more teeth may extend from an upper region of the first end proximate to an intersection between the first end and the first side, and one or more teeth may extend from a lower region of the first end proximate to an intersection between the first end and the second side. In at least one embodiment, three teeth may extend from the upper region, and three teeth may extend from the lower region. The teeth may also curve towards an axis generally orthogonal to the longitudinal axis. Alternatively, the teeth may be angled towards the axis that is generally orthogonal to the longitudinal axis.

The seal may be used to seal adjacent thermally movable components. For instance, the seal may be inserted into adjacent cavities in thermally movable components. The seal may be sized such that a relatively small gap, if any, exists between the walls of the cavity in the thermally movable components and the first and second ends of the seal. At base load of a turbine engine, a seal of this configuration substantially limits leakage of fluids past the seal. In at least one embodiment, the seal may limit cooling fluids from mixing with hot gases. As the turbine engine approaches design load, the seal and the thermally movable components are heated, and the compliant material contacts the thermally movable components, wherein the thermally compliant material may deform. In at least one embodiment in which the complaint material is formed from teeth, the teeth flex when placed in contact with the thermally movable components. When cooled, the teeth return to their original shape.

An advantage of this invention is that the compliant region of the seal enables the seal to be sized closely to the size of the opening between adjacent thermally movable components, thereby reducing the gap between the seal and the components at transient operating conditions. Such a configuration enables the seal to realize a reduction in leakage past the seal by as much as 25% over conventional seals, which increases the efficiency of the engine.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
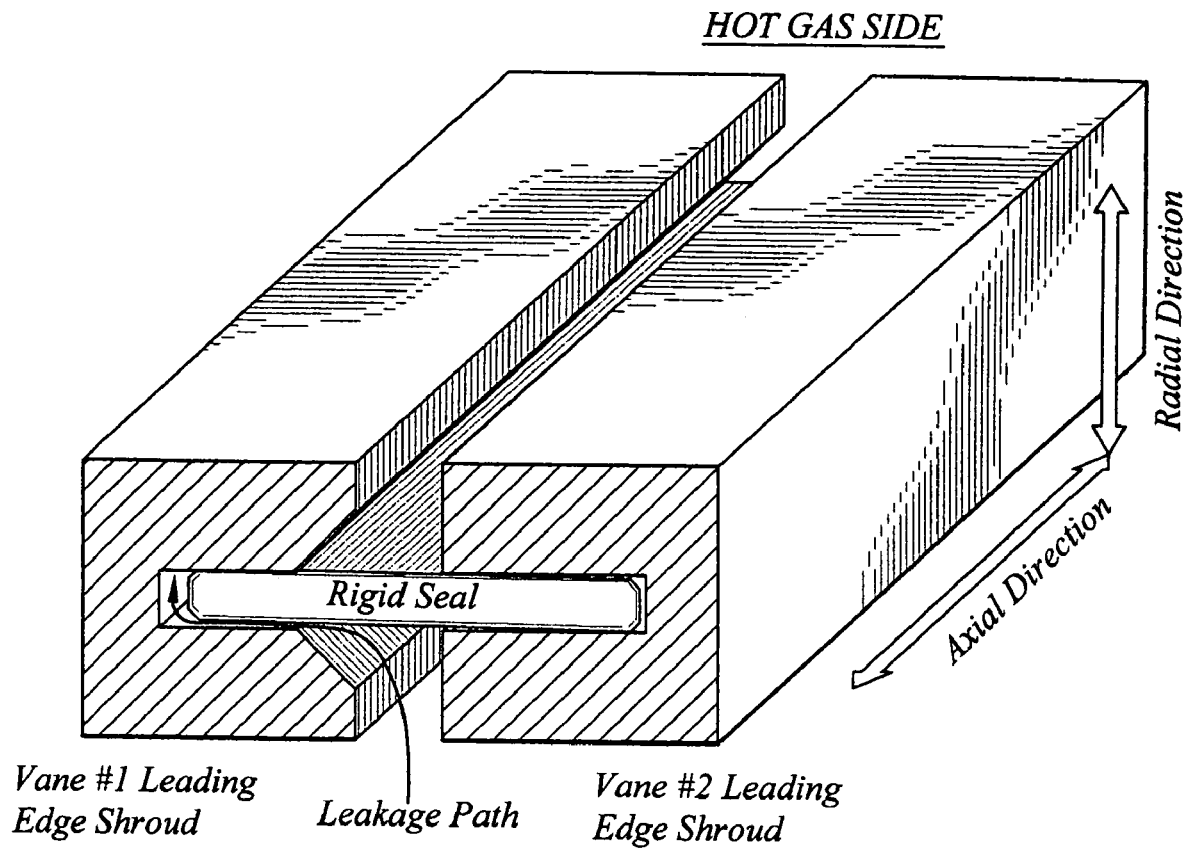
FIG. 1 is a perspective view of adjacent thermally movable components of a turbine engine with a conventional seal placed therebetween.
Figure 2:
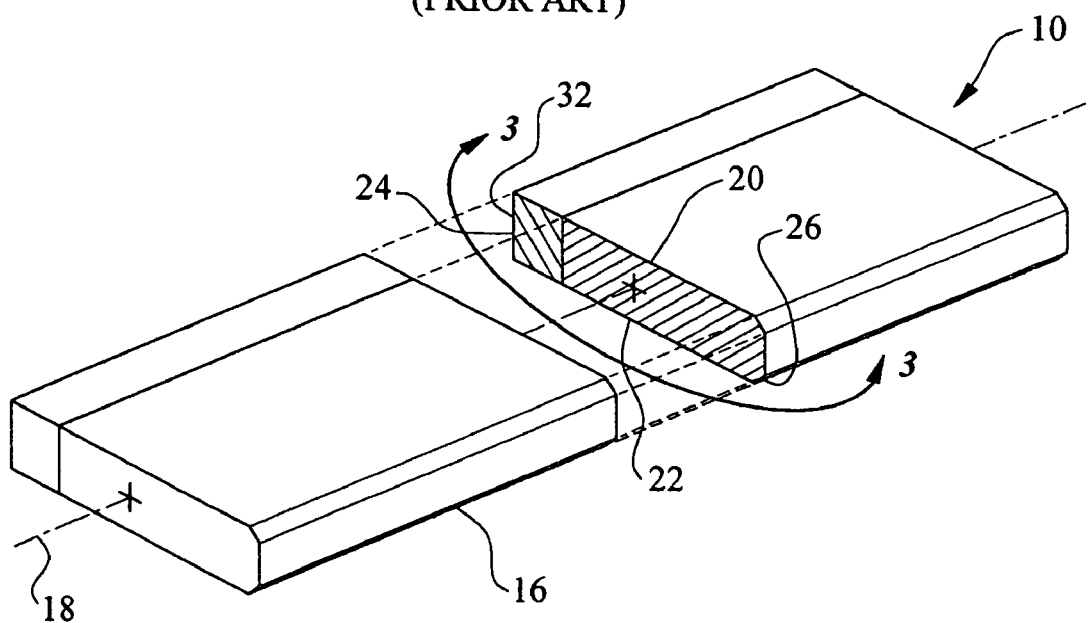
FIG. 2 is a perspective view of a seal including aspects of this invention.
Figure 3:
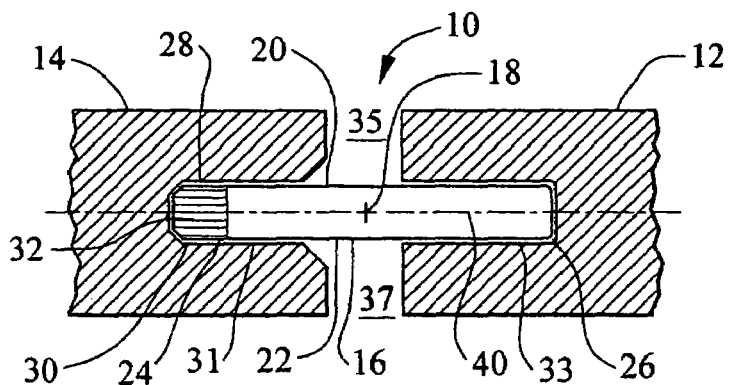
FIG. 3 is a cross-sectional view of the seal shown in FIG. 2 taken at 3-3.
Figure 9:
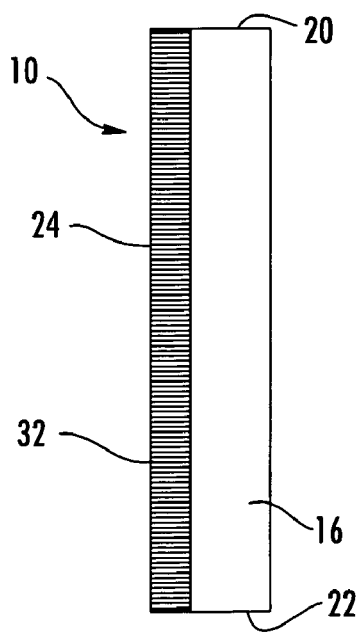
FIG. 9 is a partial cross-sectional view showing still another alternative embodiment of the compliant region.
Figure 10:
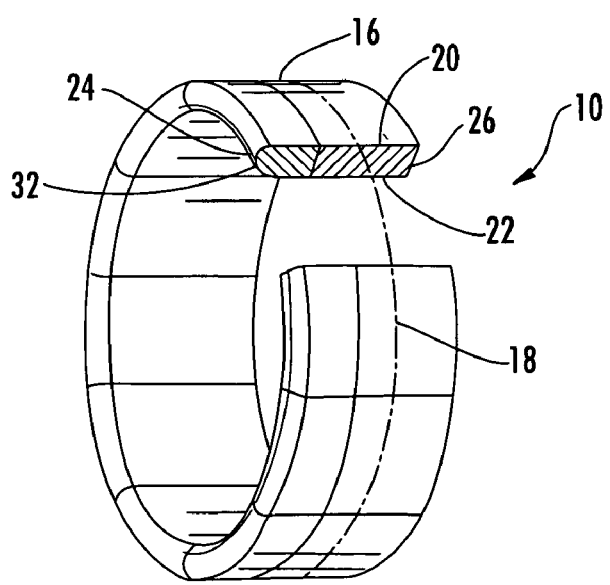
FIG. 10 is a perspective view of an alternative embodiment of a seal including aspects of this invention.

As shown in FIGS. 2-10, this invention is directed to a seal 10 usable between two thermally movable components 12 and 14. In at least one embodiment, the seal 10 may be used to seal components of a turbine engine. For instance, the seal 10 may be used to seal components of a turbine engine in which the thermally movable components 12 and 14 may be, but are not limited to, leading edge shrouds, isolation rings, ring segments, and vane segments. In a turbine engine, the seal 10 may be used to prevent cooling air from mixing with combustion gases. In addition, as shown in FIGS. 2 and 3, the seal 10 may be formed from a body 16 having a longitudinal axis 18 and be configured for sealing space between adjacent components to prevent fluid from passing between adjacent components 12 and 14. The body 16 may be formed from rigid materials capable of withstanding the environment in which it is placed, which may include hot combustion gases. In at least one embodiment, the longitudinal axis 18 of the body 16 may be curved, as shown in FIG. 10. More specifically, the body 16 may form an arc, and a plurality of bodies 16 may be used to form a circle, as shown in FIG. 10. The configuration of the arc of the body 16 is not limited to the example shown in FIG. 10; rather, the body 16 may be formed of arcs having varying degrees of curvature.

As shown in FIG. 3, the seal 10 may have a cross-section that is generally orthogonal to the longitudinal axis 18. The cross-section may be defined by a first side 20, a second side 22 generally opposite to the first side 20, a first end 24, and a second end 26 generally opposite to the first end 24. The first side 20, the second side 22, the first end 24, and the second end 26 may have generally linear surfaces, as shown in FIG. 3, or may have nonlinear surfaces in other embodiments. The distance between the first side 20 and the second side 22 is preferably less than the distance between interior sides 28 and 30 of a thermally movable component 12 or 14 so that the seal 10 may be inserted into cavities 33, 31 in the thermally movable components 12 and 14, respectively. In at least one embodiment, the first end 24 may be referred to as a leading edge and the second end 26 may be referred to as a trailing edge.

Figure 4:
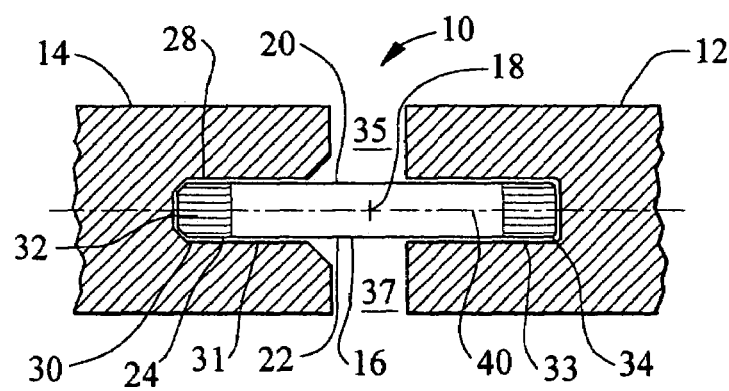
FIG. 4 is a cross-sectional view of an alternative embodiment of the seal of this invention.

The seal 10 may also include a compliant region 32 formed from a compliant material, which may be, but is not limited to, one or more teeth, a feltmetal, a honeycomb, as shown in FIG. 9, or a brush seal material. The compliant region 32 may be attached to the seal 10 using brazing or other appropriate materials. The compliant region 32 may be configured to absorb thermal expansion between the two thermally movable components 12, 14. By contacting the thermally movable components 12, 14, the seal 10 prevents fluids from passing from a first region 35 to a second region 37 on an opposite side of the thermally movable components 12, 14, as shown in FIGS. 3 and 4. In at least one embodiment, a compliant region 32 is included on only the first end 24 of the seal 10. However, in another embodiment, a first compliant region 32 is positioned at a first end 24 of the seal 10 and a second compliant region 34 is positioned at a second end 26 of the seal 10.

Figure 5:
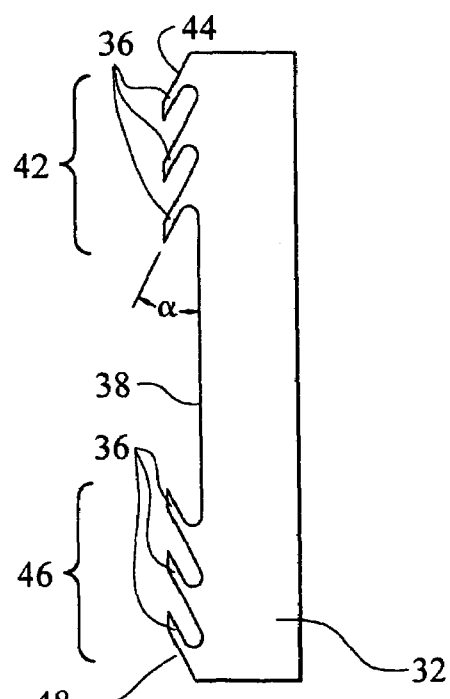
FIG. 5 is a partial cross-sectional view showing the compliant region of the seal.
Figure 6:
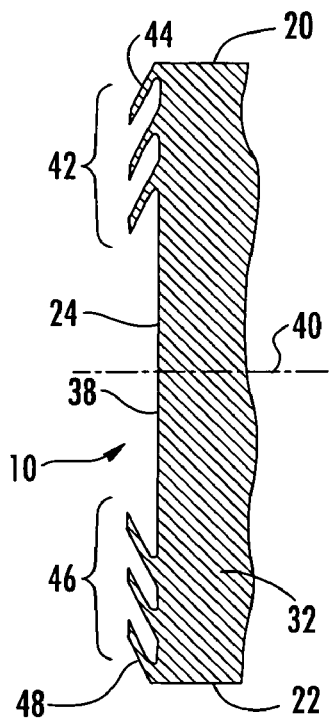
FIG. 6 is a partial cross-sectional view showing an alternative embodiment of the compliant region.
Figure 7:
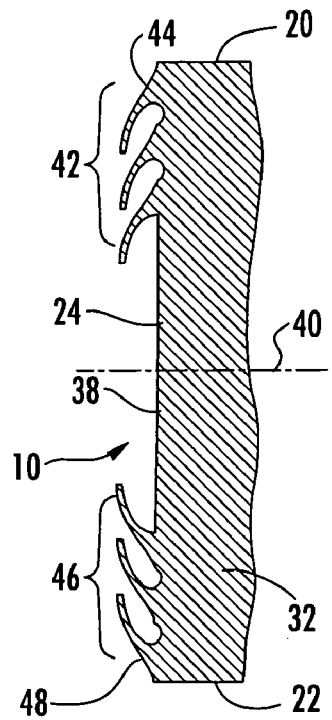
FIG. 7 is a partial cross-sectional view showing another alternative embodiment of the compliant region.
Figure 8:
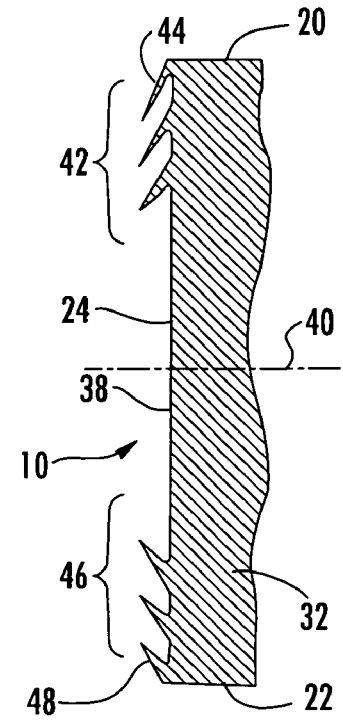
FIG. 8 is a partial cross-sectional view showing yet another alternative embodiment of the compliant region.

In at least one embodiment, the first end 24 may include one or more teeth 36, as shown in FIG. 5-8. The teeth 36 may form a labyrinth seal with the thermally movable components 12, 14. The teeth 36 may extend generally away from the first end 24. The teeth 36 may be a resilient material enabling the teeth 36 to flex during heating and expansion and spring back to an original position when cooled. As shown in FIG. 5, the teeth 36 may extend at an angle α of between about 30 degrees and about 60 degrees relative to an outer surface 38 of the first end 24, and more specifically, the teeth may extend at an angle α of about 45 degrees relative to the outer surface 38 of the first end 24. The teeth 36 may have a variety of different configurations, as shown in FIGS. 5-8. In at least one embodiment, as shown in FIG. 7, the teeth 36 may be curved toward an axis 40 generally orthogonal to the longitudinal axis 18.

As shown in FIGS. 5-8, one or more teeth 36 may extend from a upper region 42 proximate to an intersection 44 between the first end 24 and the first side 20, and one or more teeth 36 may extend from a lower region 46 proximate to an intersection 48 between the first end 24 and the second side 22. In at least one embodiment, the three teeth 36 may extend from the upper region 42, and three teeth 36 may extend from the lower region 46. The upper region 42 is defined as the portion of the first end 24 between the axis 40 and the first side 20, and the lower region 46 is defined as the portion of the first end 24 between the axis 40 and the second side 22. In at least one embodiment, the teeth 36 may be angled toward the axis 40, as shown in FIGS. 5-8. In addition, the teeth 36 may extend from only first end 24, may extend from the first end 24 and the second end 26, or may extend from other areas of the seal 10 to create a seal between the first and second ends 24 and 26 and the thermally movable components 12, 14.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A seal usable between two thermally movable components, comprising:

a body for sealing space between adjacent components to prevent a fluid from passing through the space;

wherein the body has a cross-section that has a first side, a second side generally opposite to the first side, a first end, and a second end generally opposite to the first end, wherein the first and second sides have lengths longer than lengths of the first and second ends;

wherein the first end includes at least one first tooth extending from a region on the first end proximate to an intersection between the first end and the first side and extending toward the second side of the body and at least one second tooth extending from a region on the first end proximate to an intersection between the first end and the second side and extending toward the first side of the body;

wherein the at least one first tooth extending from the region on the first end proximate to the intersection between the first end and the first side comprise three teeth, and the at least one second tooth extending from the region on the first end proximate to the intersection between the first end and the second side comprise three teeth.

2. The seal of claim 1, wherein the at least one first tooth is at an angle of between about 30 degrees and about 60 degrees relative to an outer surface of the first end and the at least one second tooth is at an angle of between about 30 degrees and about 60 degrees relative to the outer surface of the first end.

3. The seal of claim 2, wherein the at least one first tooth is at an angle of about 45 degrees and the at least one second tooth is at an angle of about 45 degrees.

4. A seal usable between two thermally movable components, comprising:
- a body for sealing space between adjacent components to prevent a fluid from passing through the space;
- wherein the body has a cross-section that has a first side, a second side generally opposite to the first side, a first end, and a second end generally opposite to the first end, wherein the first and second sides have lengths longer than lengths of the first and second ends;
- wherein the first end includes at least one first tooth extending from a region on the first end proximate to an intersection between the first end and the first side and extending toward the second side of the body and at least one second tooth extending from a region on the first end proximate to an intersection between the first end and the second side and extending toward the first side of the body;
- wherein the teeth are curved.

* * * * *